US009969143B2

(12) United States Patent
Peebles

(10) Patent No.: US 9,969,143 B2
(45) Date of Patent: May 15, 2018

(54) BAG FORMING APPARATUS

(71) Applicant: KHS GmbH, Dortmund (DE)

(72) Inventor: Donald Scott Peebles, Bradenton, FL (US)

(73) Assignee: KHS GmbH, Dortmund (DE)

(*) Notice: Subject to any disclaimer, the term of this patent is extended or adjusted under 35 U.S.C. 154(b) by 240 days.

(21) Appl. No.: 14/937,167

(22) Filed: Nov. 10, 2015

(65) Prior Publication Data
US 2017/0129203 A1 May 11, 2017

(51) Int. Cl.
*B31B 50/64* (2017.01)
*B29C 65/00* (2006.01)
(Continued)

(52) U.S. Cl.
CPC ............... *B31B 1/64* (2013.01); *B29C 65/18* (2013.01); *B29C 66/43121* (2013.01); *B29C 66/81465* (2013.01); *B29C 66/8221* (2013.01); *B29C 66/82265* (2013.01); *B29C 66/83221* (2013.01); *B29C 66/849* (2013.01); *B29C 66/8432* (2013.01); *B31B 50/64* (2017.08); *B65B 51/146* (2013.01); *B65B 51/303* (2013.01); *B29C 66/112* (2013.01); *B29C 66/8225* (2013.01); *B29C 66/8246* (2013.01); *B29C 66/9241* (2013.01); *B29C 66/92611* (2013.01); *B31B 2219/6038* (2013.01); *B31B 2219/6061* (2013.01)

(58) Field of Classification Search
CPC . B29C 66/83221; B29C 66/83; B29C 66/832; B29C 66/8322; B29C 66/82265; B29C 66/8226; B29C 66/8221; B29C 66/8246; B29C 66/92611; B29C 66/9261; B29C 66/92615; B65B 51/303; B65B 51/14
USPC .... 100/269.2, 281, 283, 292, 214, 231, 291, 100/224
See application file for complete search history.

(56) References Cited

U.S. PATENT DOCUMENTS 4,265,696 A * 5/1981 Graves .................... B29C 65/02
156/443
4,753,629 A * 6/1988 Powell .................... B29C 65/18
156/583.1
(Continued)

FOREIGN PATENT DOCUMENTS

WO 2012031877 3/2012

*Primary Examiner* — Philip C Tucker
*Assistant Examiner* — Jimmy R Smith, Jr.
(74) *Attorney, Agent, or Firm* — Allen Dyer Doppelt & Gilchrist

(57) ABSTRACT

A bag forming apparatus includes a pair of opposed sealing bars arranged on opposite sides of a forming plane, a pair of guide arms, each extending from a first arm end through the forming plane to a second arm end and carrying a respective one of the pair of opposed sealing bars, a mounting frame to which the pair of guide arms are movably mounted between the first and second arm ends, and a drive shaft connected to the second arm end of each of the pair of guide arms such that shaft rotation is operable to move the pair of opposed sealing bars into and out of engagement across a web of bag forming material traveling therebetween in the forming plane. The drive shaft can be translatable relative to the mounting frame to adjust a closure gap between the pair of opposed sealing bars.

19 Claims, 2 Drawing Sheets

(51) Int. Cl.
*B31B 1/64* (2006.01)
*B29C 65/18* (2006.01)
*B65B 51/14* (2006.01)
*B65B 51/30* (2006.01)

(56) References Cited

U.S. PATENT DOCUMENTS

| | | | | |
|---|---|---|---|---|
| 5,080,747 A | * | 1/1992 | Veix | B29C 65/18 156/352 |
| 2014/0047802 A1 | * | 2/2014 | Parcell | B29C 65/18 53/451 |

* cited by examiner

BAG FORMING APPARATUS

FIELD OF THE INVENTION

The present invention relates to bag forming, and more particularly, to apparatus for sealing webs of bag making material.

BACKGROUND OF THE INVENTION

When forming pouches or other bag from various films, a step in the forming process often entails pressing layers of film between heated sealing bars to seal one or more sides or edges of the pouch. In industrial scale operations, a continuous stream of pouches must be processed at relatively high speed, requiring frequent and accurate reciprocal movement of the sealing bars. One example of an apparatus for driving sealing bars in a pouch/bag forming process can be seen in WIPO Publication WO2012/031877, the contents of which are herein incorporated by reference in their entirety. While such apparatus have performed effectively, further improvements are possible.

SUMMARY OF THE INVENTION

In view of the foregoing, it is an object of the present invention to provide an improved bag forming apparatus and related devices and methods. According to an embodiment of the present invention, a bag forming apparatus includes a pair of opposed sealing bars arranged on opposite sides of a forming plane, a pair of guide arms, each guide arm extending from a first arm end through the forming plane to a second arm end, each first arm end carrying a respective one of the pair of opposed sealing bars, a mounting frame to which the pair of guide arms are movably mounted between the first and second arm ends such that movement of the second arm ends apart moves the first arm ends together, and a drive shaft rotatable about a shaft axis, the second arm end of each of the pair of guide arms connected to the drive shaft such that rotation of the drive shaft is operable to move the pair of opposed sealing bars into and out of engagement across a web of bag forming material traveling therebetween in the forming plane.

According to an aspect of the present invention, the drive shaft is translatable relative to the mounting frame to adjust a closure gap between the pair of opposed sealing bars. According to an additional aspect, the apparatus further includes a pair of linear bearing rails, each linear bearing rail slidably connecting a respective one of the pair of guide arms to the mounting frame.

These and other objects, aspects and advantages of the present invention will be appreciated in view of the drawings and following detailed description of preferred embodiments.

DETAILED DESCRIPTION OF PREFERRED EMBODIMENTS

Figure 1:
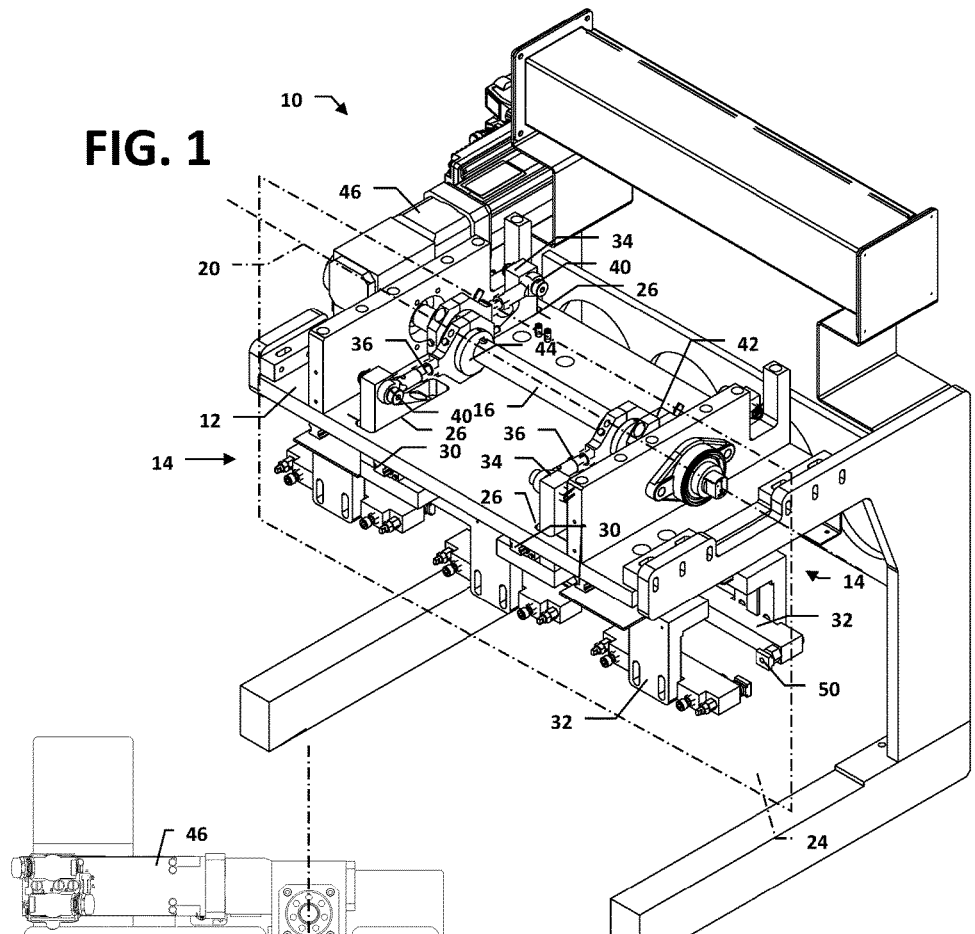
FIG. 1 is a perspective view of a bag forming apparatus, according to an embodiment of the present invention.
Figure 2:
FIG. 2 is a side view of the bag forming apparatus of FIG. 1.
Figures 3A, 3B:
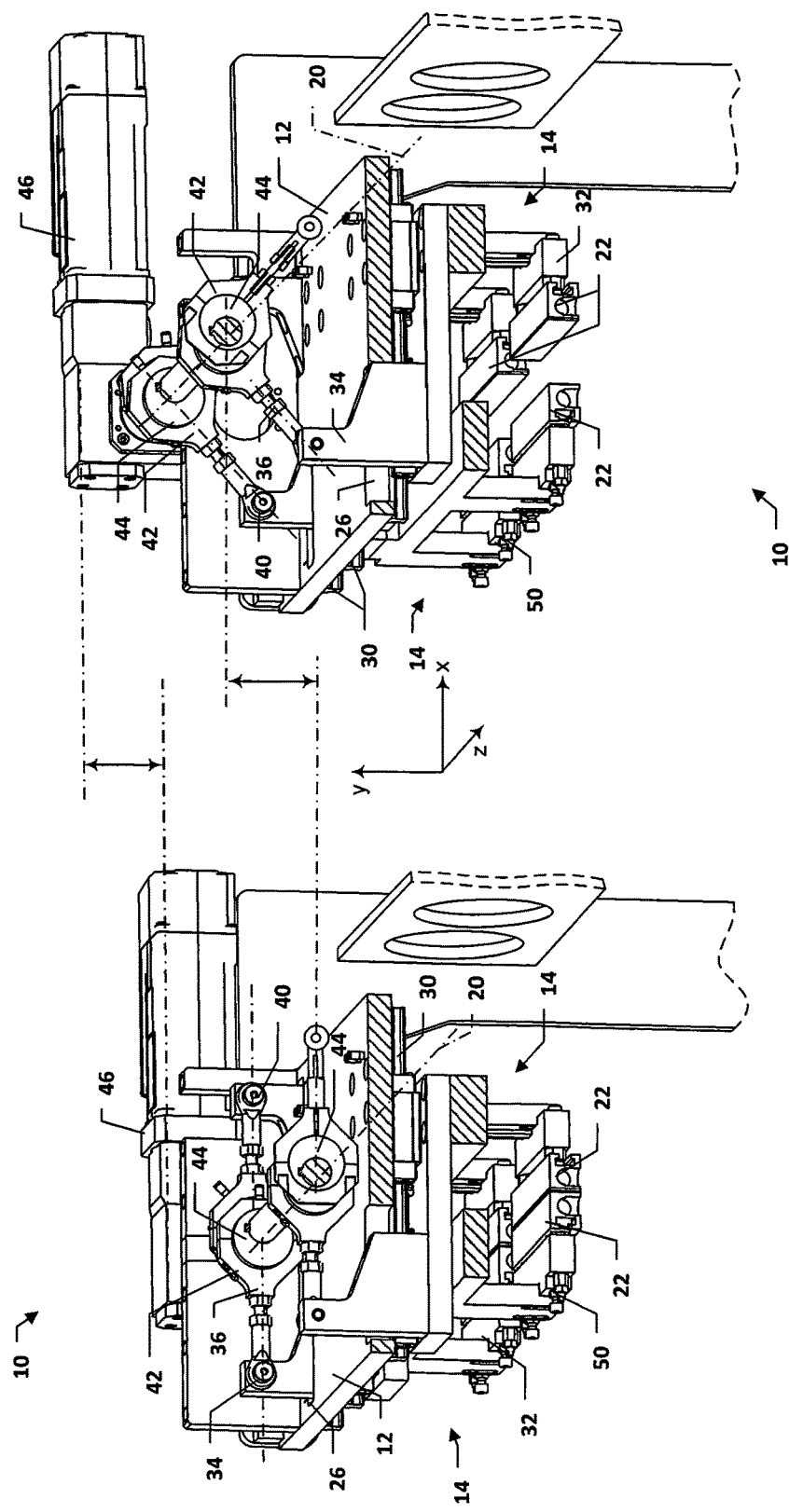
FIGS. 3A and 3B are perspective views of the bag forming apparatus of FIG. 1 with a drive shaft thereof translated between an operating and a non-operating position, respectively.

Referring to FIGS. 1 and 2, a bag forming apparatus 10 includes a mounting frame 12 to which pairs of guide arms 14 are movably mounted. A drive shaft 16 rotatable about a shaft axis 20 is connected to the guide arms 14 to impart reciprocal motion thereto. The guide arms 14 are configured to carry opposed pairs of sealing bars 22 (see FIGS. 3A, 3B showing the sealing bars 22 mounted to the guide arms 14), which are moved into and out of engagement across a web of bag forming material traveling in a forming plane 24 (going into and out of the page in FIG. 2) therebetween. As used herein, the term "forming plane" is defined to generally signify the plane in which the web of bag forming material travels when passing between the sealing bars of the bag forming apparatus.

The mounting frame 12 is preferably constructed from a plurality of interconnecting frame elements and allows the apparatus 10 to be mounted in line with additional bag forming and filling machines. A plurality of guide arm openings 26 are defined in the mounting frame 12 to allow portions of the guide arms 14 to extend therethrough. In the depicted embodiment, linear bearing rails 30 are attached to an undersurface of the mounting frame 12 on which the guide arms 14 are slidably suspended. Alternate mounting means could be employed to movably connect the guide arms 14 with the mounting frame 12. For example, the guide arms 14 could be pivotably mounted about pivot bearings or the like, or mounted via parallel linkages.

The guide arms 14 each extend between first arm ends 32, which carry the sealing bars 22, and second arm ends 34, connect to the drive shaft 16. Significantly, the guide arms 14 are generally "S" or "Z" shaped, such that they extend through the forming plane 24 between the first and second arm ends 32, 34. Being movably mounted to the mounting frame 12 between the first and second arm ends 32, 34, moving a second arm end 34 of one of the guide arms 14 away from the forming plane 24 will consequently move a first arm end 32 of the same guide arm 14 toward the forming plane 24. Likewise, moving opposed sealing bars 22 together is accomplished by simultaneously moving the second arm ends 34 of their respective guide arms 14 apart.

As with the mounting frame 12, each guide arm 14 can be formed from multiple, interconnected arm elements. Also, each guide arm 14 can be configured to carry multiple sealing bars 22 and connect to the drive shaft 16 at multiple points. In the depicted embodiment, the guide arms 14 are connected to the drive shaft 16 by drive linkages 36, which advantageously facilitate translational movement of the drive shaft 16 relative to the mounting frame 12, as will be described in greater detail below.

Each drive linkage 36 is pivotably connected to the second arm end 34 at a first linkage end 40 and pivotably connected to the drive shaft 16 at a second linkage end 42. At the first linkage end 40, a pivot pin or the like effects connection to the second arm end 34, and the second linkage end 42 forms a collar surrounding the drive shaft 16. Preferably, the length of the linkages 16 are adjustable and collars of varying dimensions can be attached.

The drive shaft 16 incorporates a plurality of oppositely-oriented cam lobes 44, about which the second linkage ends 42 are mounted. The difference between the maximum and minimum offset of the cam lobes 44 from the shaft axis 20 determines the stroke length of the sealing bars 22. To vary the stroke length, cam lobes with greater or lesser offsets can be installed on the drive shaft 16, with corresponding reconfiguration of the collars on the second linkage ends 42 and adjustment of the length of the drive linkages 36.

A rotational drive 46 is connected to the drive shaft 16 to impart rotational motion thereto. Various types of rotational drives 46 could be employed in connection with the present invention, including servo drives, direct drives, stepper motors, and the like. Advantageously, the connection configuration of the guide arms 14 allows the use of a single drive 46 and drive shaft 16 to move both sets of guide arms 14 and opposed sealing bars 22, as well as the use of a continuous rotational movement in a single direction. By varying rotation speed (e.g., by slowing rotation as the sealing bars 22 are brought into engagement), variable sealing times can be achieved. Moreover, the motion of opposed sealing bars 22 is mechanically set and synchronized, avoiding possible damage or inadequate sealing by over- or under-driving one or both sets of sealing bars 22.

During sealing operations, the sealing bars 22 are "closed" when the cam lobes 44 present opposite maximum offsets toward the second arm ends 34, such that sealing bars 22 would be engaged across a web of bag forming material therebetween in the forming plane 24. The sealing bars 22 are "fully open" when the cam lobes 44 present opposite minimum offsets toward the second arm ends 34. Thus, the fully open separation distance is proportional to the sealing bar stroke length. In the depicted embodiment, in which the guide arms 14 move linearly, the fully open distance is approximately two times the stroke length. Generally speaking, a smaller fully open distance permits quicker operation and better mechanical advantage for the application of sealing pressure. On the other hand, a larger fully open distance prevents overheating of the bag forming material due to proximity of hot sealing bars when the movement of such bag forming material is halted in the course of operations. Sealing bar maintenance is also facilitated when there is a large distance between opposed sealing bar pairs.

As indicated above, the drive shaft 16 can be translated relative to the mounting frame 12. Referring to FIG. 3A, the drive shaft 16 is shown in an operating position, where the distance between opposed sealing bars 22 in the closed position is approximately zero. In FIG. 3B, the drive shaft 16 has been translated out of the operating position (preferably via a translational drive) relative to the mounting frame 12. Although the cam lobes 44 are in the same orientation as in FIG. 3B (i.e., corresponding to the closed position in FIG. 3A), the translation results in a lessening of the distance between the second arm ends 34 and the forming plane 24, thereby increasing the gap between opposed sealing bars 22. As used herein, the term "closure gap" refers to the distance between opposed sealing bars when the drive shaft is positioned for minimum separation therebetween. In the depicted embodiment, the closure gap in the operating position of FIG. 3A is approximately zero, whereas in the non-operating position of FIG. 3B, the closure gap is some greater distance—both greater than the closure gap in the operating position and greater than zero.

The translatable drive shaft 16 advantageously allows the benefits of a smaller fully open distance (e.g., higher speed operation and greater sealing pressure), while still allowing a significant increase in the fully open distance to be achieved automatically when necessary due to stoppages in the travel of bag forming material, as well as when helpful for maintenance. It will be appreciated that the advantages of translation result from the relative motion between the drive shaft 16 and the frame 12 and attached guide arms 14. Moving the drive shaft 16 to achieve this relative motion represents a preferred embodiment, but it could also be achieved by movement of the frame 12 and guide arms 14 within the scope of the present invention. As with the rotational drive 46, various drive types could be used for the translational drive. In one embodiment, the same drive motor could be used for both drives, with a gear arrangement for shifting between rotating and translating the shaft 16.

Preferably, and as depicted, the guide arm 14 and related dimensions are approximately symmetrical on opposite sides of the forming plane 24, such that the shaft axis 20 of the drive shaft 16 lies in the forming plane 24 both in the operating position and during translation therefrom. Additionally, in the depicted arrangement, the second drive shaft 16 and rotational drive 46 are located above the mounting frame 12, with first arm ends 32 and sealing bars 22 being located therebelow. This facilitates access to the drive shaft 16 and related components for cleaning, maintenance and replacement. Also, any extraneous material from partially formed bags or their contents is less likely to be introduced into these moving mechanical components during operation. However, it will be appreciated that features of the present invention could be applied in other geometries.

Various sealing bars 22 could be mounted to the first arm ends 32, with any requisite connections being made thereto for heating, cooling, introduction of fitments, and the like. Preferably, the sealing bars 22 are connected to the first arm ends 32 with pressure adjustment mechanisms 50, such as spring-biased screws, that allow the sealing force exerted by engaged sealing bars 22 to be varied. In the depicted embodiment, the sealing bars 22 are oriented such that their long axes are horizontal—and more particularly, the sealing bars are configured for applying top seals as part of a horizontal pouch forming process. It will be appreciated, though, that features of the present invention could be applied to sealing bars in other orientations and in other bag forming processes.

The foregoing embodiments are provided for illustrative and exemplary purposes; the present invention is not necessarily limited thereto. Rather, those skilled in the art will appreciate that further variations and modifications for particular circumstances will fall within the scope of the invention herein shown and described, and of the claims appended hereto.

What is claimed is:

1. A bag forming apparatus comprising:
    a pair of opposed sealing bars arranged on opposite sides of a forming plane;
    a pair of guide arms, each guide arm extending from a first arm end through the forming plane to two second arm ends, each first arm end carrying a respective one of the pair of opposed sealing bars;
    a mounting frame to which the pair of guide arms are movably mounted between the first and second arm ends such that movement of the second arm ends apart moves the first arm ends together;
    a drive shaft rotatable about a shaft axis, the drive shaft including two pairs of oppositely-oriented cam lobes, each of the two second arm ends of the pair of guide arms connected with a respective one of the two pairs of oppositely-oriented cam lobes such that rotation of the drive shaft is operable to move the pair of opposed sealing bars into and out of engagement across a web of bag forming material traveling therebetween in the forming plane; and
    a pair of linear bearing rails, each linear bearing rail slidably connecting a respective one of the pair of guide arms to the mounting frame for linear movement toward and away from the forming plane.

2. The bag forming apparatus of claim 1, further comprising a pair of pressure adjustment mechanisms, each pressure adjustment mechanism connecting a respective one of the pair of opposed sealing bars to the first arm end of a respective one of the pair of guide arms and operable to adjust a pressure exerted across the web of bag forming material when the pair of opposed sealing bars are engaged thereacross.

3. The bag forming apparatus of claim 1, wherein the drive shaft is translatable relative to the mounting frame to adjust a closure gap between the pair of opposed sealing bars.

4. The bag forming apparatus of claim 3, wherein the drive shaft is translatable relative to the mounting frame from an operating position, where the closure gap is approximately zero, to a non-operating position, where the closure gap is greater than zero.

5. The bag forming apparatus of claim 3, wherein, throughout translation of the drive shaft relative to the mounting frame, the shaft axis lies in the forming plane.

6. The bag forming apparatus of claim 3, further comprising two pairs of drive linkages, each of the two pairs of drive linkages having a first linkage end pivotably connected to a respective one of the two second arm ends of a respective one of the pair of guide arms and a second linkage end pivotably connected to a respective one of the two pairs of oppositely-oriented cam lobes.

7. The bag forming apparatus of claim 3, further comprising a rotational drive connected to the drive shaft to impart rotational motion thereto about the shaft axis.

8. The bag forming apparatus of claim 7, wherein the rotational drive translates with the drive shaft.

9. The bag forming apparatus of claim 7, further comprising a translational drive connected to the drive shaft to impart translational motion thereto perpendicular to the shaft axis.

10. The bag forming apparatus of claim 1, wherein each of the pair of opposed sealing bars is horizontally elongated.

11. The bag forming apparatus of claim 1, wherein the mounting frame is located above the opposed pair of sealing bars and the drive shaft is located above the mounting frame.

12. The bag forming apparatus of claim 1, further comprising an additional pair of opposed sealing bars arranged on opposite sides of the forming plane;
    wherein each of the pair of guide arms includes an additional first arm end, each additional first arm end carrying a respective one of the additional pair of opposed sealing bars.

13. A bag forming apparatus comprising:
a pair of opposed sealing bars arranged on opposite sides of a forming plane;
a pair of guide arms, each guide arm extending from a first arm end through the forming plane to two second arm ends, each first arm end carrying a respective one of the pair of opposed sealing bars;
a mounting frame to which the pair of guide arms are movably mounted between the first and second arm ends such that movement of the second arm ends apart moves the first arm ends together;
two pairs of drive linkages, each of the drive linkages extending between a first linkage end and a second linkage end, the first linkage end pivotably connected to a respective one of the two second arm ends of a respective one of the pair of guide arms;
a drive shaft rotatable about a shaft axis, the drive shaft including two pairs of oppositely-oriented cam lobes, the second linkage end of each of the two pairs of drive linkages pivotably connected to a respective one of the two pairs of oppositely-oriented cam lobes;
a rotational drive connected to the drive shaft to impart rotational motion thereto about the shaft axis to move the pair of opposed sealing bars into and out of engagement across a web of bag forming material traveling therebetween in the forming plane; and
a translational drive connected to the drive shaft to impart translational motion thereto perpendicular to the shaft axis to adjust a closure gap between the pair of opposed sealing bars.

14. The bag forming apparatus of claim 13, further comprising a pair of pressure adjustment mechanisms, each pressure adjustment mechanism connecting a respective one of the pair of opposed sealing bars to the first arm end of a respective one of the pair of guide arms and operable to adjust a pressure exerted across the web of bag forming material when the pair of opposed sealing bars are engaged thereacross.

15. The bag forming apparatus of claim 13, further comprising a pair of guide rails, each guide rail slidably connecting a respective one of the pair of guide arms to the mounting frame.

16. The bag forming apparatus of claim 13, wherein each of the pair of opposed sealing bars is horizontally elongated.

17. The bag forming apparatus of claim 13, wherein the mounting frame is located above the opposed pair of sealing bars and the drive shaft is located above the mounting frame.

18. The bag forming apparatus of claim 17, wherein the rotational and translational drives are both located above the mounting frame.

19. The bag forming apparatus of claim 13, further comprising an additional pair of opposed sealing bars arranged on opposite sides of the forming plane;
    wherein each of the pair of guide arms includes an additional first arm end, each additional first arm end carrying a respective one of the additional pair of opposed sealing bars.

* * * * *